HENRY R. BUTTERFIELD.
Improvement in Machines for making Shovel Handles.
No. 121,274.
Patented Nov. 28, 1871.
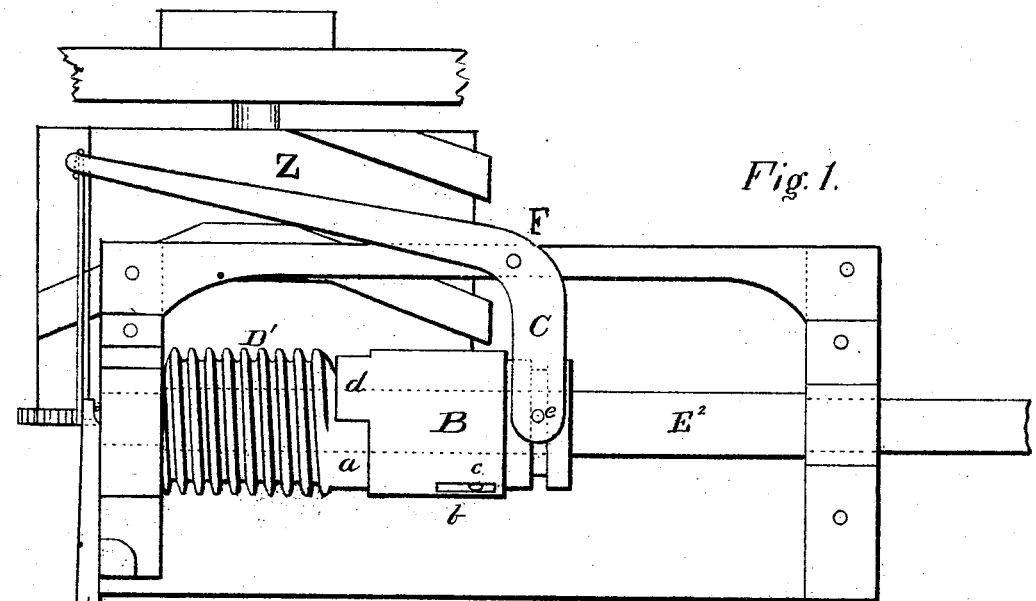
Fig. 1.
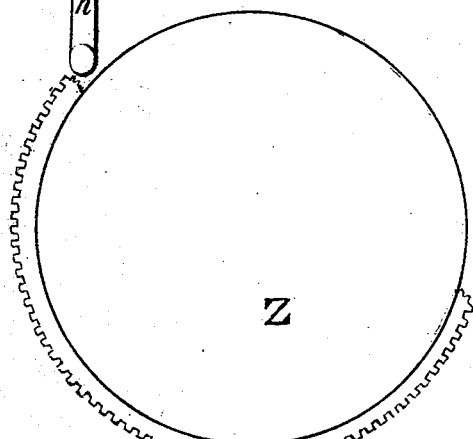
Fig. 2.
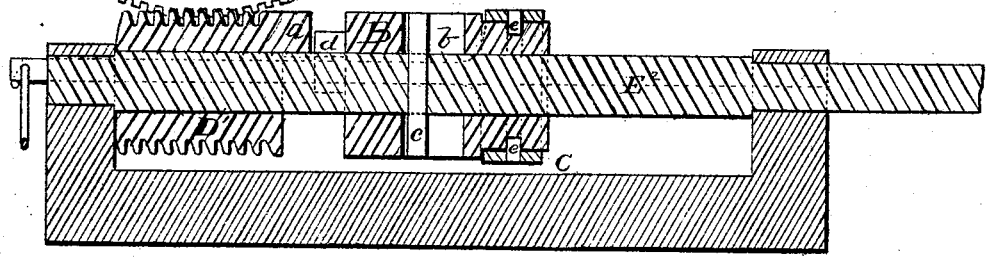
Witnesses.
Villette Anderson.
J. C. Smith.
Inventor.
Henry R. Butterfield
by
John W. Butterfield
his attorney.

UNITED STATES PATENT OFFICE.

HENRY R. BUTTERFIELD, OF VASSALBOROUGH, MAINE.

IMPROVEMENT IN MACHINES FOR MAKING SHOVEL-HANDLES.

Specification forming part of Letters Patent No. 121,274, dated November 28, 1871.

*To all whom it may concern:*

Be it known that I, HENRY R. BUTTERFIELD, of Vassalborough, in the county of Kennebec and State of Maine, have invented a new and valuable Improvement in Machine for Making Shovel-Handles, (patented by Russell D. Bartlett March 14, 1854;) and I do hereby declare that the following is a full, clear, and exact description of the construction and operation of the same, reference being had to the annexed drawing making a part of this specification, and to the letters and figures of reference marked thereon.

Figure 1 of the drawing is a top view of my improvement. Fig. 2 is a central vertical longitudinal section thereof.

This invention has relation to an improvement upon the machine for making shovel-handles for which a patent was granted to Russell D. Bartlett, of Bangor, Penobscot county, Maine, March 14, 1854, (extended from March 14, 1868;) and consists in the construction and novel arrangement of a clutch-connection between the driving-shaft and the worm which actuates the cam Z, whereby the necessity of shifting the worm into and out of engagement with the gear of said cam is obviated and consequent wear of parts prevented.

In the accompanying drawing the letters employed to designate the parts are the same as those which were used in the original Letters Patent to mark like portions.

$E^2$ designates the driving-shaft, rotating in stationary journal-seats. $D'$ represents the worm or endless screw, loosely placed on the shaft $E^2$, and designed to have a free motion thereon. One end of this collar is provided with a sector-like projection or stud, $a$, steel-faced, hardened, and also adjustable both in the worm-gear and in the clutch-hole drilled through the thread cut on the end of the stud. B represents a loose collar on the shaft $E^2$. This collar is designed to have a longitudinal movement on said shaft, and is slotted at $b$ to receive the pin $c$, which, for purposes of greater strength and security, is designed to pass entirely through the shaft $E^2$ and to project on each side thereof. The end of the collar B which lies next the worm $D'$ is provided with a sector-like projection or stud, $d$, similar to that found on the end of the worm, and designed to engage therewith. The other end of this collar is grooved around its periphery to receive the studs $e$ of the forked lever C, which is pivoted to the frame of the machine at any convenient point F, and connected by means of a rod or otherwise to an operating lever, $h$. The object of this mechanism is to enable the worm $D'$ to be kept constantly engaged with the toothed wheel of the cam Z, suitable provision being made for bringing said worm into and out of connection with the driving-shaft $E^2$.

The advantage of this improvement is that the shaft $E^2$ is not vibrated as in the original mechanism, but is rotated in journal-seats which are stationary, and, on account of the constant connection between the thread of the worm and the teeth of the toothed wheel, much wear of these delicate parts is prevented, which, in the original arrangement, was due to the grinding action of said thread and teeth when coming into engagement.

What I claim as my invention, and desire to secure by Letters Patent, is—

As an improvement upon the machine for making the hand part or head of shovel-handles patented by Russell D. Bartlett March 14, 1854, the combination, with the shaft $E^2$ and pin $c$, of the worm-clutch collar B, the worm-clutch $D'$, and the forked lever C with the cam Z of said machine, substantially as and for the purpose specified.

In testimony that I claim the above I have hereunto subscribed my name in the presence of two witnesses.

HENRY R. BUTTERFIELD.

Witnesses:
J. D. JAQUITH,
C. R. MCFADDEN.

(172)